June 18, 1968 O. MYERS 3,389,225

LIMITED CAPACITY TELEPHONE SYSTEM

Filed May 15, 1964 2 Sheets-Sheet 1

INVENTOR
OSCAR MYERS
BY [signature]
ATTORNEY

LIMITED CAPACITY TELEPHONE SYSTEM

Filed May 15, 1964 2 Sheets-Sheet 2

United States Patent Office 3,389,225
Patented June 18, 1968

3,389,225
LIMITED CAPACITY TELEPHONE SYSTEM

Oscar Myers, New York, N.Y., assignor to International Telephone and Telegraph Corporation, New York, N.Y., a corporation of Delaware Filed May 15, 1964, Ser. No. 367,614
7 Claims. (Cl. 179—7)

ABSTRACT OF THE DISCLOSURE

A limited capacity telephone system is one utilizing a transmission medium, such as submarine cable, earth satellite, or the like, which transmits traffic at high density over a medium carrying a limited frequency band. Depending upon the nature of equipment used, the traffic may require a narrow width band of frequencies (as in a telegraph system), a medium width band of frequencies (as in a voice system), or a wide band of frequencies (as in a facsimile system). The invention combines as many narrow bands as may be required to accommodate the traffic at hand. A tone signal identifies the band width in actual use so that charges may be billed accordingly.

This invention relates primarily to limited capacity telephone systems, and more particularly to systems for transmitting communication signals over limited capacity media such as submarine cables and artificial earth satellites.

Usually, the number of long distance communication channels which extend between any two terminals is determined by the grade of service that is required between such terminals. Therefore, for any given grade of service, any system encounters all trunks busy conditions at the same rate, without regard to the absolute number of either calls placed or trunks extended between the two terminals. It is not important that a relatively few calls must be rejected because of these all trunks busy conditions. Almost immediately, additional circuits become available owing to the termination of other calls which are in progress when the all trunks busy signal occurs.

These and other systems may be provided with carrier type receiving and transmitting equipment which modulates each message on one of many carrier channels. The bandwidth of the required channel depends upon the type of message which is being sent. Thus, by way of example, telegraphic, voice and facsimile signals require narrow, medium and broad bandwidths, respectively, which could be (for example) 100-, 3000-, and 5,000-cycles per second. Still other bandwidth requirements will readily occur to those skilled in the art. For example, unique band width requirements may occur when costly computers communicate with each other.

In most telephone systems, a traffic study is made to determine how many channels are required for each bandwidth. Then, the available frequency spectrum is allocated according to the users needs. Usually, narrow band transmission equipment may have access only to narrow band channels, medium band equipment to medium band channels, etc. This means that the telephone company or administration must provide enough of every type of channel to give the desired grade of service to it. But this is wasteful of channel transmission capacity since, for any given grade of service, excess capacity must be provided for each of the three types of bandwidths. The question becomes one of economics; is it more expensive to provide excess transmission capacity or to take some other action? Usually, it is most economical to provide the excess capacity.

In other telephone systems, however, it is not economically possible to provide the additional channels which are required to give the desired grade of service. Therefore, it is necessary to provide some other means for making a more efficient use of the available channels. Two exemplary telephone transmission systems which have only a limited number of channels use submarine cables and artificial earth satellites. When using this type of limited capacity system, the subscribers should, of course, be charged only for the facilities they use. When this involves a narrow band, they should be charged only for the transmission on the narrow band. On the other hand, when the transmission is via medium or a broad band, charges should be made on that basis.

Accordingly, an object of the invention is to provide a new and improved limited channel telephone system. More particularly, an object is to provide a great variety of transmission band widths for a wide variety of equipments. In this connection, an object is to provide switching facilities for combining or dividing bandwidths to provide facilities as they are required.

Another object is to provide for varying a transmission medium bandwidth while a call is in progress.

Yet another object is to switch the billing of the call simultaneously with the switching of the bandwidth.

In accordance with an aspect of this invention, conventional telephone switching systems or other equipments are interconnected by way of a transmission medium having a limited bandwidth capacity such as a submarine cable or satillite. Interposed between the conventional system and the limited capacity medium (on each end thereof) is a carrier access switching circuit. To avoid having to install excessive transmission capacity, this carrier access switching circuit combines or divides wide and narrow channels to assemble a communication channel having the correct bandwidth for any given call. Thus, thirty narrow bands (100–c.p.s.) may be combined at one time to provide a single medium band (3000–c.p.s.) and fifty narrow bands (100–c.p.s.) may be combined at another time to provide a single broad band (5000–c.p.s.). In like manner, any convenient number of bands may be combined or divided to provide the channels of correct bandwidth, as they are required.

Subscribers selectively send tone signals to indicate the type of equipment and, therefore, the bandwidth that they require. Responsive to these tone signals, the carrier access switching circuit selects the equipment and a channel of the required bandwidth. If such a channel is not available, the access switching circuit provides one by either assembling a plurality of narrow bands or sub-dividing a broad band, whichever may then be available. Also, responsive to the tone signal, automatic toll ticketing billing rates are adjusted to conform to the charges for the transmission media capacity which is actually used. The carrier access switch and billing rates may be changed while a call is in process.

The above mentioned and other objects of this invention together with the manner of obtaining them will become more apparent and the invention itself will be best understood by making reference to the following description of an embodiment of the invention taken in conjunction with the accompanying drawings in which.

*Brief description*

Figure 1:
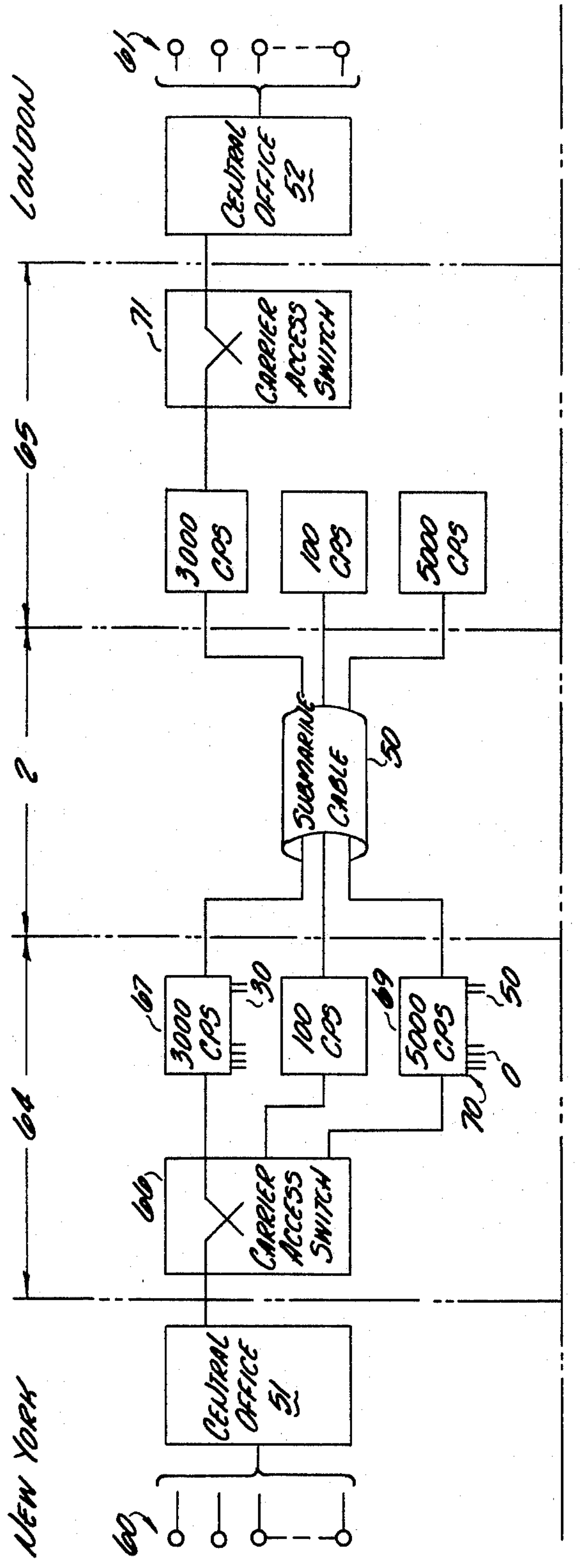
FIG. 1 is a block diagram which shows how the invention enables conventional telephone systems to be coupled to a submarine cable via carrier access switching circuits.

The first specific system (FIG. 1) that is described herein uses a submarine cable 50 for interconnecting conventional telephone equipment 51 (which might be in New York City) with other conventional telephone equipment 52 (which might be in London). The second specific system (FIG. 2), is one wherein one of more artificial satellites 53 orbit the earth to interconnect the remote points via ground stations 54, 55. Preferably, the satellites are in orbit at an altitude which causes the satellites to remain fairly stationary over a particular area on the earth's surface, i.e. each orbit is completed during the same twenty-four hour period of the earth's rotation. To orient the reader, the entire FIG. 2 may be visualized as connected, in lieu of the submarine cable 50, between the dot-dashed lines "2" of FIG. 1.

FIG. 1 shows a plurality of subscriber lines 60, 61 in the two remotely located areas on the surface of the earth. Each subscriber line is connected to and served by a nearby central office 51, 52 of any conventional design. Interposed between these conventional offices and each adjacent end of the cable 50 or satellite transmission channel 53 is a carrier access switching circuit 64, 65. (The equipments 64, 65 are identical.)

Figure 2:
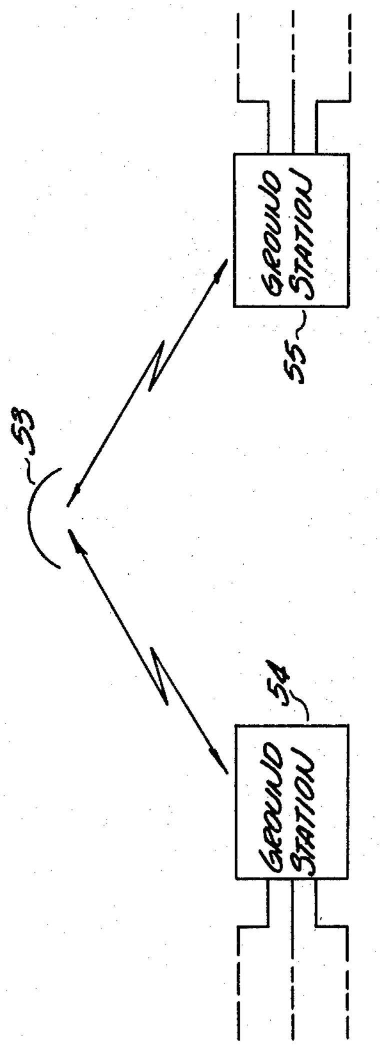
FIG. 2 shows an alternative embodiment using a satellite communication system.

In keeping with an aspect of the invention, either the system of FIG. 1 or the system of FIG. 2, provides a transmission media having only a limited transmission capacity. Regardless of the width of the total bandwidth transmitted through the media, that total bandwidth may be sub-divided into a number of narrow bands (e.g. 100-c.p.s.) segments. Thus, the principle is that a device 66, of any convenient design (such as a crossbar switch) selects as many 100-c.p.s. segments as may be required for any given message. For example, the drawing shows equipment 69 which provides a 5000-c.p.s. channel that is assembled from fifty 100-c.p.s. segments, as indicated at 70.

Normally, a number of 100-c.p.s. segments are grouped together to form a plurality of 3000-c.p.s. bands, and another number of 100-c.p.s. segments are grouped together to form a plurality of 5000-c.p.s. bands. The remainder of the 100-c.p.s. segments are assigned to function as a plurality of narrow bands. In a communication system such as this, traffic patterns are fairly stable. Thus, it is unlikely that these basic groupings will change very much, and a small number of channels in each group may be assigned to swing from serving as part of one bandwidth to serving the next. This way, only a few segments will be switched, at frequent intervals, between the bandwidth categories. The vast majority of the channels will almost always serve the same bandwidth categories.

Preferably, a single, narrow band is permanently assigned to serve as a by-path for the equipments 64, 65 so that they may communicate with each other. Hence, equipments 66, 71 always line up to assign the same segments to serve in the same channel groupings. When it is necessary to assemble or sub-divide a channel, the equipments 66, 71 communicate with each other over the by-path and select another common group of segments for assembly or division.

*Detailed description*

Figure 3:
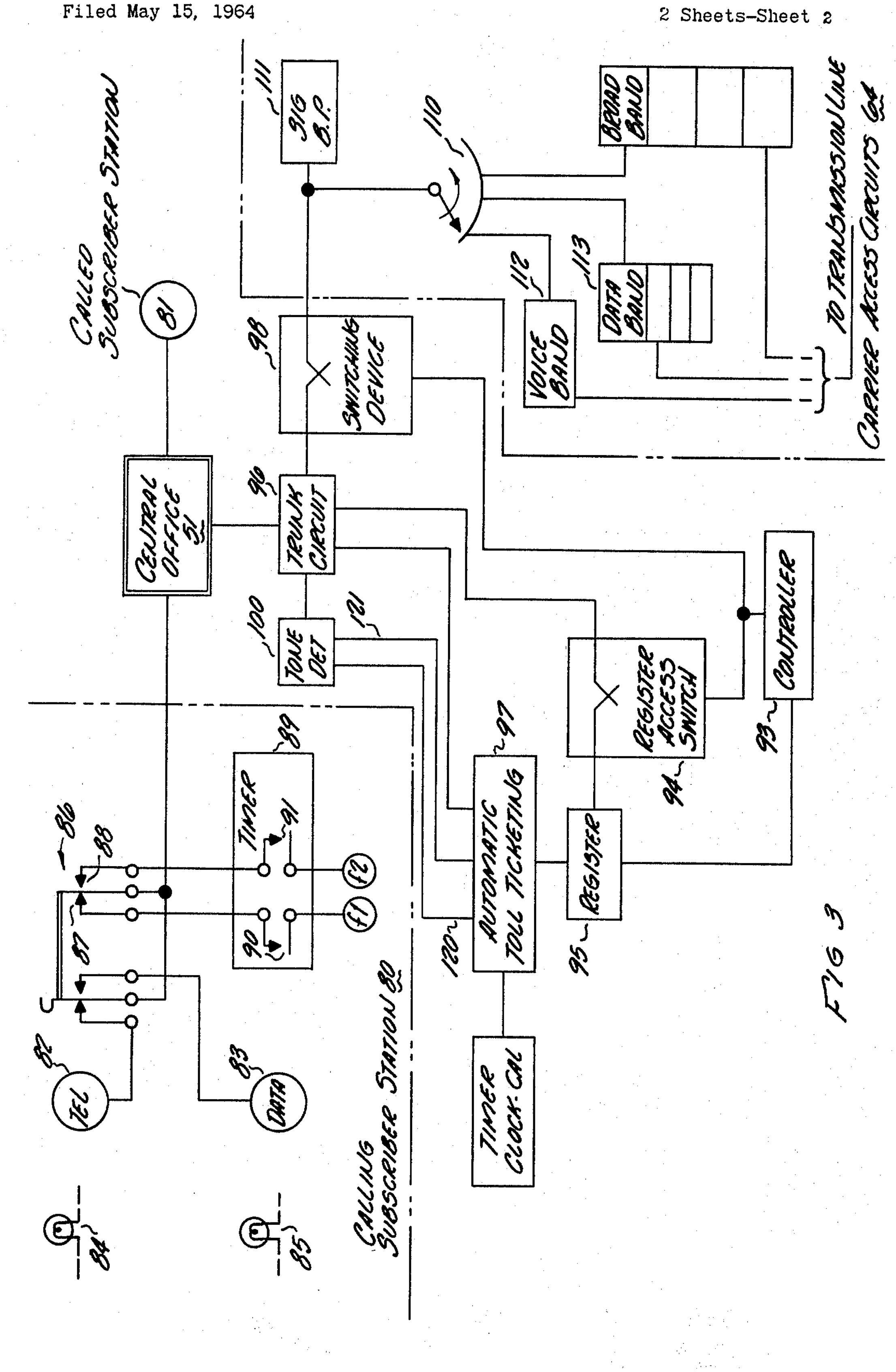
FIG. 3 is a block diagram showing a carrier access switching circuit which uses the principles involved.

The nature of the carrier accessing circuits will become more apparent from a study of FIG. 3. Two subscriber stations are shown at 80, 81 as being interconnected via central office 51. (These may be among the stations 60 of FIG. 1.) Thus, a calling station 80 may reach a called station 81 in any well known manner.

The calling station 80 is here shown as comprised of a telephone 82 and a data processing device 83. For present purposes, the telephone 82 is described as one requiring a 3000-c.p.s. medium bandwidth channel, and the data device 83 is described as requiring a 100-c.p.s. narrow bandwidth channel. Another device (such as a facsimile transmitter) device could be shown to illustrate a device requiring a broad bandwidth channel. Each of these devices 82, 83 is provided with a suitable signal 84, 85 for giving supervision. For example, in its simplest form, these signals could be light bulbs which light to indicate when the associated equipment is in use.

Also located at the subscriber station is a switch 86 for selecting between the transmitters 82, 83. Part of this switch is a set of contacts 87, 88 for selectively sending either of two tone signals, $f1$, $f2$ to indicate which type of equipment is in use and, therefore, the transmission bandwidth that is required. A timer 89 includes any suitable device for closing and then opening a pair of normally open contacts 90, 91, thereby sending the selected tone during a short period of time.

Before a call is established, a controller 93 operates a register access switch 94 to pre-assign a register 95 to serve the trunk circuit 96. This way, any digital signals received from station 80 are stored in register 95 to control both an automatic toll ticketing equipment 97 and the controller 93. This, in turn, will cause the trunk circuit 96 to seize an idle carrier access switching circuit 64 via switching matrix 98.

If the subscriber station now goes off-hook with the switch 86 in the position shown in the drawing, a tone of a first frequency $f1$ is sent through contacts 87 to central office 51 during the time period while contacts 90 are closed. Alternatively, either a combination of frequencies or a series of digits may be sent through contacts 90, depending upon system needs. Regardless of the type of signal that is sent, it means that telephone 82 is connected to the line and that a channel of medium bandwidth is required. If, on the other hand, the switch 86 is thrown to its operated position, the contacts 88 close to send a tone of a second frequency $f2$ (or combination of frequencies) over the line during the time period while the contacts 91 are closed. This means that the data device 83 is connected to the line and a channel of narrow bandwidth is required.

Next, the subscriber dials the directory number required to complete a call. The system may be adapted to respond to any type of calling signals; however, the assumption is that the subscriber establishes the call by using a standard telephone calling device which may include either a dial or push-buttons. For example, FIG. 3 contemplates the use of a push-button, tone caller. Thus, two pairs of the standard push-button caller frequencies may be used as the frequencies $f1$ and $f2$ as long as they are not duplicated by the regular digital signals. Or, the usual frequency caller signals could be used and the special meaning could be distinguished by the time of their occurrence. Thus, frequencies may be detected at a tone detector 100 which is used for detecting all dial signals.

If the dialed number is the directory number of another subscriber 81 in the central office 51, that called subscriber may be seized and signaled in any suitable manner. On the other hand, if the dialed number indicates (as for example, by special area codes or prefixes) a call requiring the limited capacity facilities, the central office 51 seizes a trunk circuit 96 which has been pre-assigned to be associated with the carrier access circuit 64.

The carrier access circuit 64 comprises any suitable switching means, symbolically shown at 110, for separating or combining carrier channels. Preferably, this switch is an electronic device having extremely fast switching capabilities. The distant end (65, FIG. 1) of the limited capacity carrier media will have an identical switch (not shown) coupled thereto. These two switches 64, 65 "talk" to each other in any well known manner via a special by-pass signal channel 111. Thus, switch 110 and its counterpart on the other end of the cable always line-up to transmit and receive any given message via the same channel carrier frequencies.

Means are provided for selecting channels having the required bandwidth. In greater detail, the switch 110 may seize a 3000-c.p.s. voice channel 112 when the frequency $f1$ is received to indicate that the telephone 82 is calling or switch 110 may seize a 100-c.p.s. data channel 113 when the switch 86 is thrown to send frequency $f2$ which indicates that the data transmitter 83 is calling. On still other occasions, switch 110 may select one or more of the broad band channels, as when facsimile equipment or other equipment (not shown) is connected to the line.

This invention is not limited to any particular frequency allocation. Quite the contrary, the available bandwidth will be assigned in any convenient manner, and any type of transmission equipment may be served. Perhaps, the voice bands may be assigned at the low frequency end of the transmission spectrum and broad bands at the other or high frequency end of the spectrum with the narrow data bands in the middle. Ideally, but unlikely, the assignments might be perfect and no reassignments would ever be required. In reality, however, the data transmission spectrum on either side of the data bands may be combined or divided to provide the number of channels required in any bandwidth at any given time. Thus, some of the data band allocations may occasionally drift off into the segments nominally reserved for either voice or broad band transmission. However, little overall drifting is anticipated since traffic patterns may be predicted.

Means are provided for charging the calling subscriber at a rate corresponding to the transmission capacity actually used. Suppose, for example, that a call may begin as a voice call, and tone detector 100 detects the frequency $f1$. A signal is then sent over conductor 120 to cause the automatic toll ticketing equipment 97 to bill the calling subscriber at a relatively high rate. The calling subscriber reaches the called subscriber and during a conversation, they decide to transmit data. Both subscribers throw their keys 86 to an operated position, and the frequency $f2$ is sent to the tone detector 100. It now marks the conductor 121, and the automatic toll ticketing system 97 switches to a relatively low billing rate. The trunk circuit 96 holds the connection to the subscriber line 80 while the switch 110 and its counterpart on the other end of the cable, select a data band channel. If the switches do not find an idle data band, the signal 84 is actuated and switch 110 returns to the original voice band channel. The automatic toll ticketing equipment is commanded over conductor 120, to return to the high billing rate while the subscribers talk to each other again. On the other hand, if the switches do find a data band channel, the original voice band is released and the signal 85 indicates that the data transmitters are in use.

The features of special interest are as follows:

(1) A large number of alternating current class marks can be generated at the station to indicate the nature of the station and also the nature of the wanted band.

(2) These class marks can also be used to determine the charging rate. Thus, charges for narrow band circuits could be at a lower rate than voice, and voice at a lower rate than broad band.

(3) The plan permits dividing voice circuits to provide narrow band, or combining them to provide broad band facilities. If the requested facilities are not available, the following typical alternatives could be presented to the customer by voice announcements:

(a) "The facilities requested are all busy, but if you wait you will receive the first to become available."

(b) "The facilities you requested are all busy. Please place your call again at a later time."

(c) "The facilities you requested are all busy. If you will signal (by depressing a special key) an operator will assist you."

(4) Because signals generated at the station are A.C., they can be sent through established voice connections in conventional telephone systems.

While the principles of the invention have been described above in connection with specific apparatus and applications, it is to be understood that this description is made only by way of example and not as a limitation on the scope of the invention.

I claim:

1. A telephone system comprising a plurality of conventional switching equipments interconnected by a medium having a limited bandwidth of transmission capacity, said equipments requiring channels of different bandwidths for transmitting messages over said medium, means interposed between the ends of said medium and said equipments for giving said equipments access to said medium, said transmission capacity being divided into a plurality of narrow sub-bands, and means responsive to demands from said equipments for combining and separating the sub-bands to provide a plurality of channels of different bandwidths which correspond to the bandwidth requirements of the equipments coupled to transmit over said medium at any given time.

2. The system of claim 1 and means for controlling said access means to change the bandwidth of said channels while a call is in progress.

3. The system of claim 2 and means for switching the billing rate of a call simultaneously with the change of said bandwidth.

4. The system of claim 1 and a plurality of subscriber stations, means associated with said conventional switching equipment for extending calls from said subscriber stations through said equipments and over said medium to a distant location, means at said subscriber station for selectively sending any one of a plurality of signals for identifying the type of equipment coupled at said station to said medium, and therefore the bandwidth of the required channel, and means responsive to said signal for operating said access means to select a channel of a bandwidth corresponding to said identified equipment for transmission over said medium.

5. The system of claim 4 and automatic toll ticketing means, and means responsive to said signals for causing said ticketing means to bill said call at a rate which corresponds to the bandwidth of the channel selected by said accessing circuit.

6. The system of claim 4 wherein said signals comprise a plurality of alternating currents, and means at said subscriber stations for selecting between sources of said currents.

7. The system of claim 6 wherein said alternating currents are voice frequency signals.

References Cited

UNITED STATES PATENTS

| | | | |
|---|---|---|---|
| 2,920,143 | 1/1960 | Filipowsky | 329—39 |
| 3,150,236 | 9/1964 | Gorgas et al. | 170—18.21 |
| 3,238,305 | 3/1966 | Bergman et al. | 179—15 |

KATHLEEN H. CLAFFY, *Primary Examiner.*

H. ZELLER, *Assistant Examiner.*